United States Patent [19]

Fukushima et al.

[11] Patent Number: 5,270,877
[45] Date of Patent: Dec. 14, 1993

[54] INFORMATION RECORDING MEDIUM AND INFORMATION RECORDING AND REPRODUCING APPARATUS

[75] Inventors: Yoshihisa Fukushima, Osaka; Isao Satoh, Neyagawa; Yuji Takagi, Hirakata; Yasushi Azumatani, Neyagawa; Hiroshi Hamasaka, Nishinomiya, all of Japan

[73] Assignee: Matsushita Electric Industrial Co., Ltd., Osaka, Japan

[21] Appl. No.: 726,686

[22] Filed: Jul. 8, 1991

[30] Foreign Application Priority Data

Jul. 6, 1990 [JP] Japan .................. 2-180063

[51] Int. Cl.$^5$ .............................. G11B 5/09
[52] U.S. Cl. ........................ 360/48; 360/49; 360/53
[58] Field of Search .............. 360/48, 53, 49, 54, 360/72.1, 72.2; 369/54, 58, 48, 32, 59

[56] References Cited

U.S. PATENT DOCUMENTS

| | | | |
|---|---|---|---|
| 4,656,532 | 4/1987 | Greenberg et al. | 360/48 |
| 4,754,345 | 6/1988 | Karlstetter | 360/49 |
| 4,814,903 | 3/1989 | Kulakowski et al. | 360/48 |
| 4,835,757 | 5/1989 | Abiko | 369/54 |
| 4,935,825 | 6/1990 | Worrell et al. | 360/54 |
| 5,068,842 | 11/1991 | Naito | 369/32 |
| 5,153,879 | 10/1992 | Tanaka et al. | 369/59 X |

OTHER PUBLICATIONS

Proposed ANS for Digital Information Interchange 90mm Optical Disk Data Storage Cartridge, A U.S. Contribution to ISO/IEC JTC1/SC23, Sep. 1989.

Primary Examiner—Paul Gensler
Assistant Examiner—Ali Neyzari
Attorney, Agent, or Firm—Wenderoth, Lind & Ponack

[57] ABSTRACT

A disk shaped information recording medium has a virtual ROM area where data sectors, and parity sectors are recorded, and a disk definition area where management data of a virtual ROM area is recorded in a rewritable user area information recording and reproducing apparatus fabricates the information recording medium. Also, the information recording and reproducing apparatus prohibits a data recording operation with respect to the virtual ROM area and recovers a data of the defective sector detected in the virtual ROM area using a parity sector.

8 Claims, 9 Drawing Sheets

INFORMATION RECORDING MEDIUM AND INFORMATION RECORDING AND REPRODUCING APPARATUS

BACKGROUND OF THE INVENTION

The present invention generally relates to an information recording medium where the data is recorded and reproduced in sectors of a given length, and an information recording and reproducing apparatus for recording and reproducing the data with the use of the information recording medium.

A ROM disk having previously recorded data on at least one portion of the information recording medium is being used at the object of distributing software and so on to many users with lower prices. The data format of the ROM disk is being standardized with 90 mm rewritable optical disks provided as the subject in the Optical Disk Standardization Committee (ISO/IEC JTC1/SC23/WG2). The contents thereof are described in the proposal: N72 10090.

FIG. 8 is an area layout showing schematically the layout of each area assigned to the partial ROM disk described in the draft proposal. In FIG. 8, a rewritable area where the data recording and reproducing may be performed and a ROM area where only data reproduction may be performed are assigned within the user area where the user data is recorded. In addition to the user area, a defect management area where the control data of the user area and the defect lists are recorded and a control track area where the disk control data of the optimum laser power and so on are recorded are assigned to specific locations on the disk. Although the management data is recorded on both the sides of the user area in the proposal in order to improve the reliability, a detailed description thereof has been omitted so as to simplify this description. The defect management area is composed of a primary defect list area for recording the primary defect list where the addresses of the defective sectors detected from the rewritable area in the format processing is stored during the format processing; a secondary defect list area for recording the secondary defect list where addresses of the defective sectors detected from the rewritable area and the address of the alternate sectors are collectively stored during the data recording operation; and, a disk definition area for recording the disk definition structure, where the management data of the respective areas assigned to the disk is recorded. The committee proposal defines a rewritable disk where the entire user area is a rewritable area and a ROM disk where the entire user area is a ROM area.

In the control track area and the ROM area, a concave-convex shaped track is formed at the disk manufacturing time so as to record the information. Although the data can be read from these areas, the recorded information cannot be rewritten. As the optical characteristics in these areas are different from the rewritable area, the data recording and reproducing apparatus is required to identify the ROM area for the focus control, the tracking control, the reproducing signal processing, and the write protection function with respect to the ROM area and so on. As the existence of the ROM area and the size thereof are different depending upon the disk, the start track address and the end address are recorded within the control track area as the management data of the ROM area.

FIG. 9 is an area layout of the ROM area interior formed within the user area. In FIG. 9, the ROM area is divided into a plurality of ROM groups. The ROM group is composed of data sectors with the user data being recorded on it, and parity sectors with the parity data being recorded on it. When one track is composed of 25 sectors, the most fundamental ROM group is composed of one track with the sector 0 through the sector 23 being assigned to the data sector and the sector 24 being assigned to the parity sector. At this time, the parity data to be recorded on the parity sector is defined as follows with the user data of the k the byte in the sector n being D (n,k).

$$D(24, k) = D(0,k) * D(1,k) * \ldots * D(23,k)$$

where an operator * shows an exclusive OR operation. When, for example, the sector 0 has been detected as an uncorrectable error sector in the error correction processing, the user data of the error sector is computed from the following formula using correct data read from all the other sectors to be included in the ROM group.

$$D(0,k) = D(1,k) * D(2,k) * \ldots * D(24,k)$$

FIG. 10 is a data block diagram of a disk definition structure for managing the respective areas assigned to the disk. A data identifier with (0A0A)h is recorded on the head for identifying that the read data is the disk definition structure. A certification flag following it is a flag showing whether or not the certification of the rewritable area has been performed during the format processing. Followed by them, the management data of the rewritable area and the ROM area assigned to the user area are recorded. The management data of ROM area includes number of the ROM groups, the number of data sectors per group and the number of parity sectors per group. Finally, the start addresses of the respective areas are recorded as the management data of the primary defect list area and the secondary defect list area.

But in the development process of such a ROM disk, the disk manufacturing step from the cutting process of the master disk having the ROM area to the disk duplication process using the stamper is carried out. Accordingly, when the manufacturing number of the ROM disks is as restricted in number as, for example, several hundred, the manufacturing cost per disk becomes higher. On the other hand, in the editing process of the application data, the sample ROM disk is made after the operation of the application has been confirmed on the magnetic disk drive unit. But in the operation test using the sample ROM disk, the reduction in the performance because of the difference in the data transfer speed between the magnetic disk drive unit and the optical disk drive unit or the inconvenient operation due to application bugs which rewrite the data on the magnetic disk may be detected. As several kinds of sample ROM disks are normally made before the operation test of the application is completely confirmed, the editing process of the ROM disk becomes longer.

SUMMARY OF THE INVENTION

Accordingly, the present invention has been developed with a view to substantially eliminating the above discussed drawbacks inherent in the prior art and has for its essential object to provide an information recording medium, which has the function and performance equivalent to the conventional ROM disk when a small amount of ROM disk is supplied to users at a lower price or when the sample ROM disk is made for a shorter time in the editing process of the ROM disk. Also, it is to provide an information recording and reproducing apparatus for making the information recording medium, and further, an information recording and reproducing apparatus for performing the recording and reproducing operation of the user data wing the information recording medium.

In accomplishing these and other objects, according to one preferred embodiment of the present invention, the information recording and reproducing apparatus of the present invention, there is provided an information recording and reproducing apparatus using a disk-shaped information recording medium having a user area having user data recorded thereon and a disk definition area having area management data recorded thereon, which includes: a data transferring means for transferring the device command and the user data; an area assigning means for assigning a virtual ROM area into the rewritable user area and for producing the area management data including the management data of the virtual ROM area; a parity computing means for computing parity data; an error correction code producing means for producing a data block and a parity block with added error correction codes; a data preserving means for temporarily preserving the data block, the parity block and the drive control data including the area management data; a data recording means for respectively recording the data block and the parity block on the virtual ROM area and for also recording the area management data on the disk definition area.

The information record medium of the present invention, which is formed by the above described information recording and reproducing apparatus, has a virtual ROM area where the user cannot record any data although data recording can be performed physically, and a disk definition area where the area management data of the virtual ROM area is recorded.

Further, the information recording and reproducing apparatus of the present invention using the above described information recording medium, comprises: a data transfer means for transferring the device command and the user data; a data reproducing means for reading the area management data from the disk definition area, and also for respectively reading the data block and the parity block from the virtual ROM area, a data preserving means for temporarily preserving the data block and the parity block, and the drive control data including the area management data, a write prohibiting means for prohibiting the data recording operation in the virtual ROM area, an error detecting means for performing error correction with respect to the data block and the parity block and for also detecting a defective sector having an uncorrectable error; a data recovering means for generating the user data of the defective sector.

By the above described construction, the information recording and reproducing apparatus of the present invention prohibits the data recording operation in the virtual ROM area in accordance with the area management data read from the disk management area and also, recovers the user data of the defective sector using of the parity data, so that it becomes possible to perform the same data recording and reproducing operation as the conventional ROM disk with respect to the information recording medium having the virtual ROM area.

DESCRIPTION OF THE PREFERRED EMBODIMENT(S)

Figure 1:
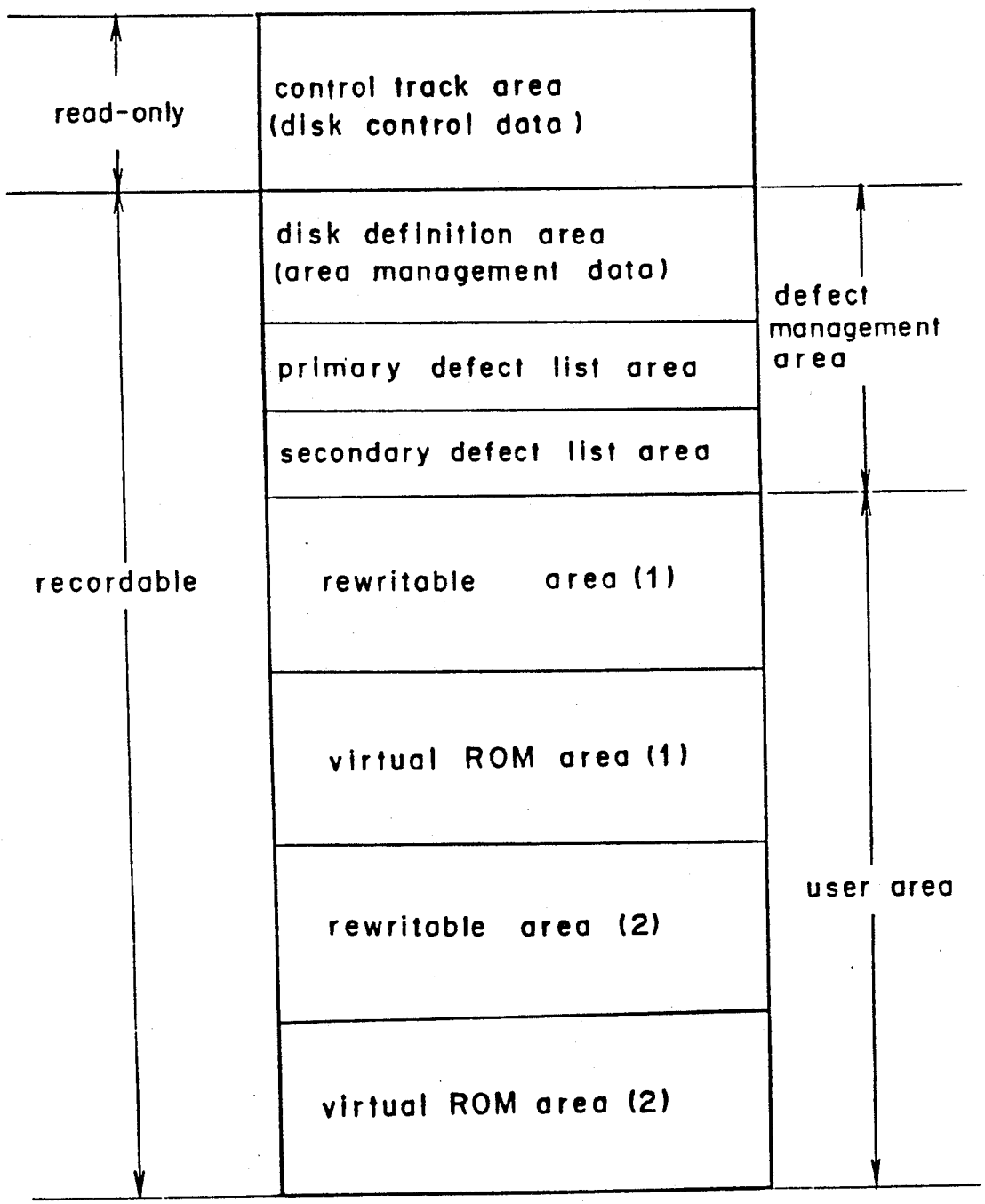
FIG. 1 is an area layout of an information recording medium in accordance with a first embodiment of the present invention.

Before the description of the present invention proceeds, it is to be noted that like parts are designated by like reference numerals throughout the accompanying drawings.

An information recording medium of the present invention, and an information recording and reproducing apparatus for making the information recording medium, an information recording and reproducing apparatus for performing the recording and reproducing operation of the data using the information record medium will be described hereinafter with reference to the drawings. FIG. 1 is an area layout in accordance with a first embodiment of the information recording medium of the present invention. In FIG. 1, the control track area, the defect management area and the user area are assigned to the information recording medium as in the conventional embodiment, and the user area is composed of rewritable areas and virtual ROM areas. A virtual ROM area, where data recording by the user has been logically prohibited, is divided into a plurality of ROM groups which have data sectors and parity sectors as in the conventional ROM area. The defect management area is composed of a disk definition area, a primary defect list area, and a secondary defect list area as in the conventional embodiment. But the area management data which is different from the conventional embodiment is recorded on the disk definition area. The area management data includes the management data of the rewritable area, the virtual ROM area, and the ROM area assigned within the user area.

Figure 2:
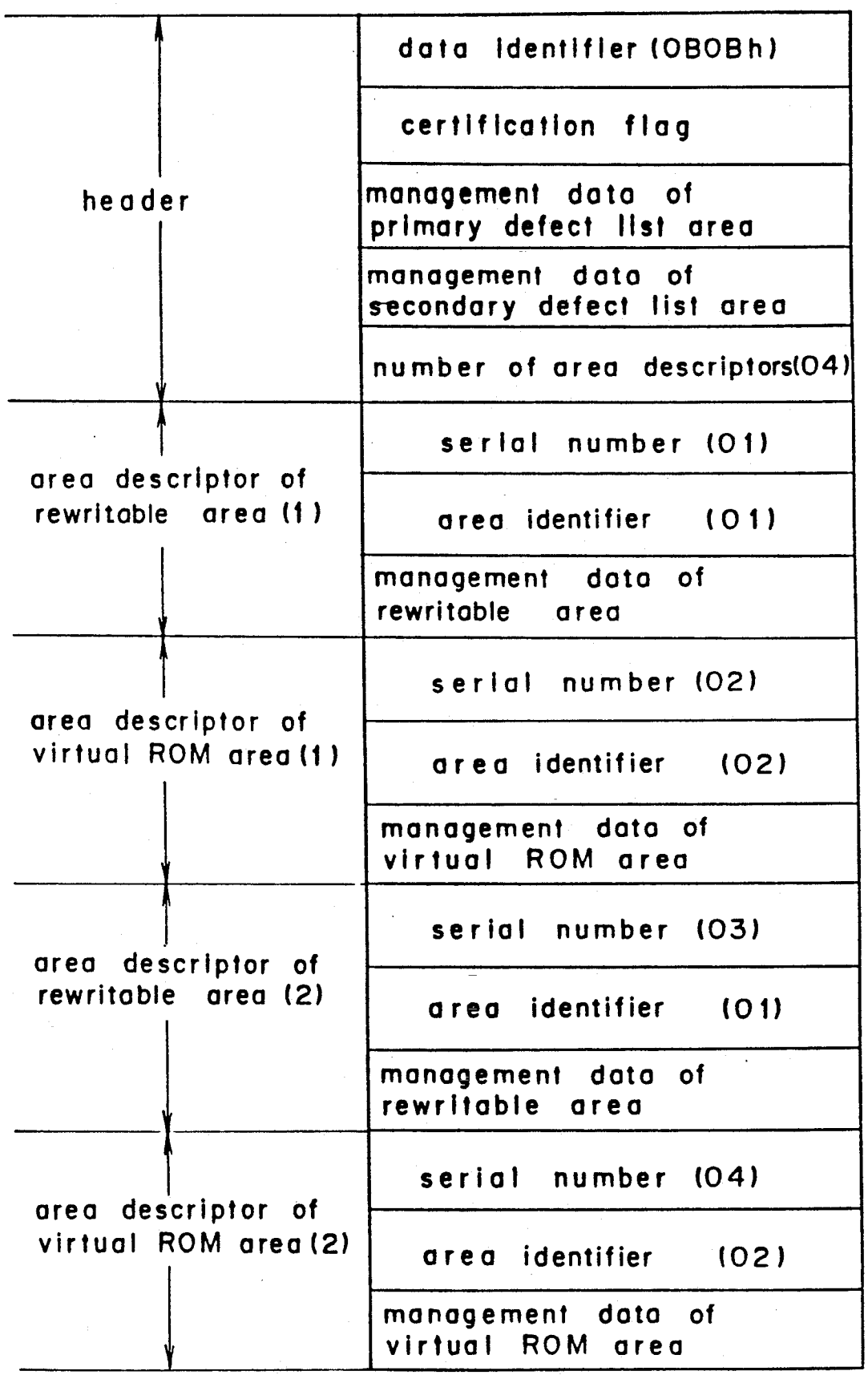
FIG. 2 is a data structure of the area management data in accordance with one embodiment of the present invention.

FIG. 2 is the data structure of the area management data. The area management data shown in FIG. 2 is composed of one header and four area descriptors in accordance with the data structure of FIG. 1. In order to identify that the read data is the area management data, the (OBOB) h is recorded as the data identifier in the head of the header. The disk certification flag following the header, and the management data of the primary defect list area and the secondary defect list area are the same as those used in the disk definition structure in the conventional embodiment. The total number of rewritable areas, the ROM area and the virtual ROM area to be assigned within the user area are recorded in the last portion of the header.

An area descriptor having the management data of each area is recorded, continuing to the header, in a 1 : 1 correspondence with respect to the area assigned within the user area. Serial numerals showing the sequence relationship within the user area are recorded at the head of the area descriptor. The area identifier is recorded so as to identify which of rewritable area/virtual ROM area/ROM area the corresponding area is, and is respectively set at the (01) in the rewritable area, at the (02) in the virtual ROM area, at the (3) in the ROM area. The area control data in the corresponding area is recorded in the last portion of the area descriptor. In the case of the rewritable area, the number of rewritable groups, the number of data sectors per group and the number of spare sectors per group are recorded as the area control data. Also, in the case of the virtual ROM area and the ROM area, the number of ROM groups, the number of data sectors per group and the number of parity sectors per groups are recorded as the area control data.

The information recording medium explained in FIG. 1 is a virtual ROM disk having a virtual ROM area instead of a conventional ROM area. Compared with the conventional ROM disk, such a virtual ROM disk is made in a shorter time period by recording the virtual ROM area using a special drive unit. If the virtual ROM disk is used as the sample disk in the editing process of the application data, it is possible to make the sample disk for a short time and to perform the operation test immediately, and thus, application data is confirmed. Therefore, the editing process of the application data is shortened, so that the ROM disk may be easily developed. Also, when a small amount of ROM disk is required, it is possible to duplicate and distribute the virtual ROM disk, so that a lower priced ROM disk may be supplied to the user.

Figure 3:
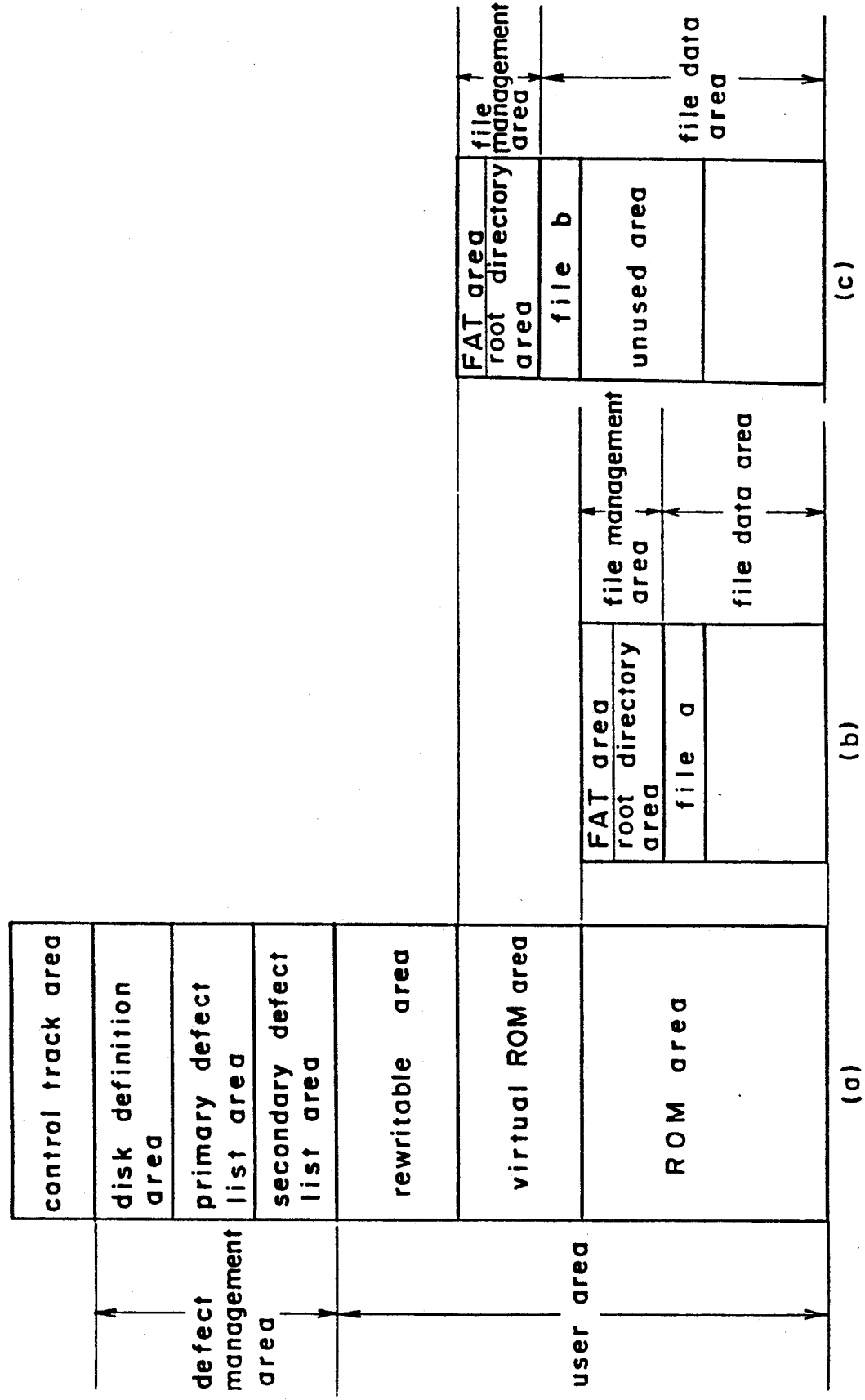
FIG. 3 is an area layout of the information recording medium in accordance with a second embodiment of the present invention.

FIG. 3 is an area layout in accordance with an embodiment of the information recording medium of the present invention. Element (a) of FIG. 3 is a physical area layout of the information recording medium, and the user area is composed of the rewritable area, the virtual ROM area and the ROM area. At this time, the area management data having three area descriptors is recorded in the disk definition area. Element (b) of FIG. 3 is a logical data format of a partition in a case where the whole ROM area is managed as one partition. When the MS DOS has been applied into the file management of the partition, a file allocation table (FAT) and a root directory are recorded in the file management area and sub-directories and files are recorded in the file data area. element (c) of FIG. 3 is a logical data format of a partition in a case where the ROM area and the virtual ROM area are combined so as to compose the one new partition. The expansion of the partition by the additional recording of such a virtual ROM area is used so as to replace the old file recorded in the ROM area. When, for example, the file a in the ROM area is replaced by the new file b, the new FAT and the root directory together with the file b are also recorded in the virtual ROM area. As the partition starts at the head of the virtual ROM area in Element (c) of FIG. 3, the location of other files recorded in the ROM area also have to be changed relatively. Therefore, the contents of the new FAT and the root directory to be recorded in the virtual ROM area have to be changed. The new FAT manages the file, the old FAT and the root directory in the ROM area as the unused area. As the start address and the capacity of the partition are changed, the volume control data with the management data of each partition is modified in the rewritable area or the virtual ROM area (when the rewritable area does not exist). It becomes possible to easily replace the unrewritable data in the ROM area by the formation of the new virtual ROM area within the rewritable area. Such data replacement is effective for the upgrading and the customization of the application data recorded on the ROM area.

The information recording and reproducing apparatus for making the information recording medium having the virtual ROM area, and the information recording and reproducing apparatus for carrying out the data recording and reproducing operation using the information recording medium with the virtual ROM area being formed on it will be described hereinafter.

Figure 4:
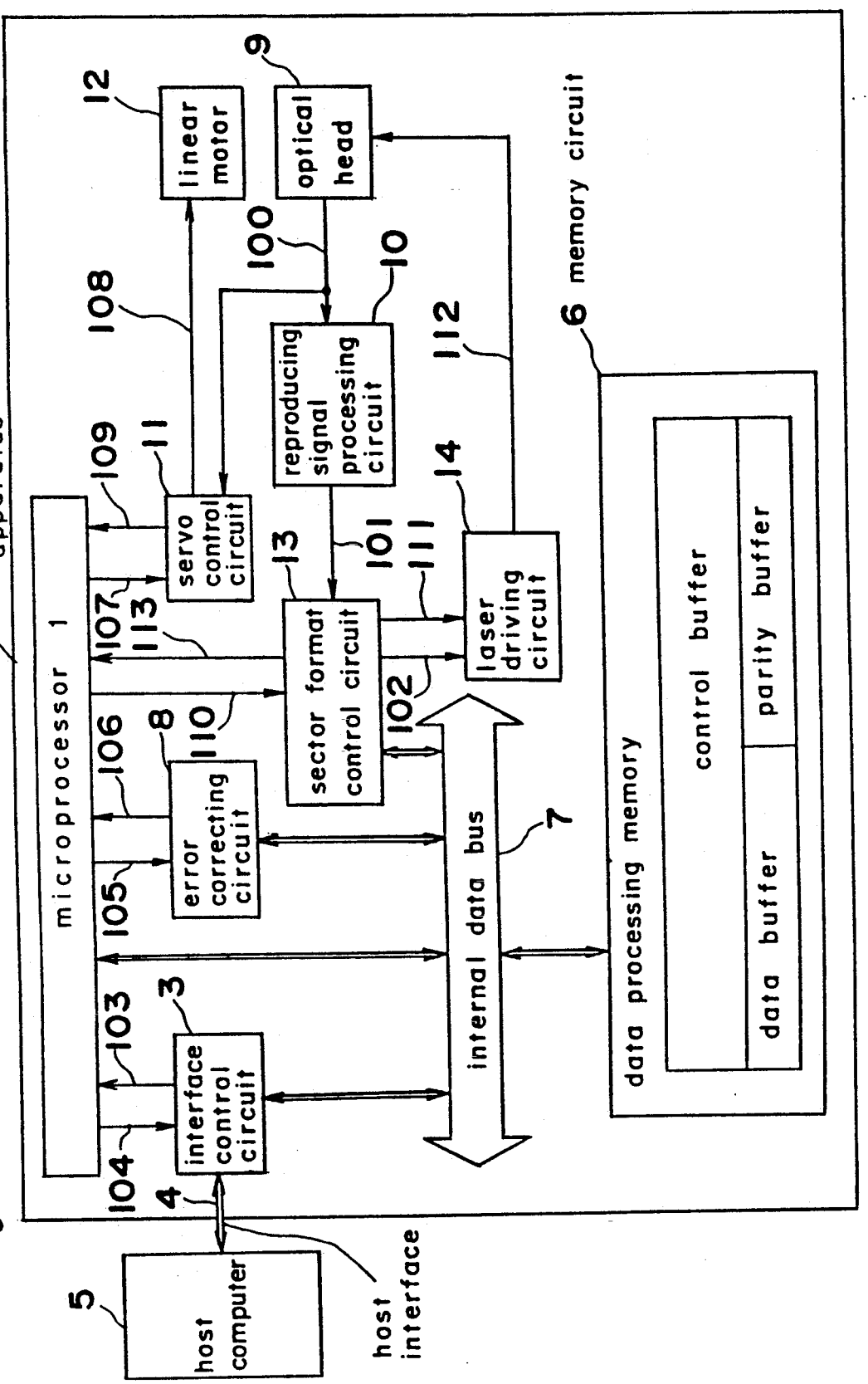
FIG. 4 is a block diagram of an information recording and reproducing apparatus.

FIG. 4 is a block diagram showing one embodiment of the information recording and reproducing apparatus of the preset invention. In FIG. 4, the microprocessor 1 controls the entire information recording and reproducing apparatus 2 and also carries out the calculation of the parity data in accordance with the firmware accommodated within it. The interface control circuit 3 is connected to a host computer 5 through a host interface 4 such as a SCSI bus so as to control the transferring of the commands, the user data and so on. The memory circuit 6 is composed of a RAM, and is divided therein into a data buffer for the data block to be recorded and read from the data sector, a parity buffer for the parity block to be recorded, and read from the parity sector, a control buffer for the drive control data such as disk control data; area management data; defect lists and so on. The error correcting circuit 8 adds the error correction code to the user data or the parity data stored in the memory circuit 6 during the data recording operation so as to produce the data block and the parity block, and also, detects and corrects data errors during the data reproducing operation. The optical head 9 converts the signal read from the optical disk (not shown) into an electric signal and feeds the pre-amplifier output signal 100 into the reproducing signal processing circuit 10 and the servo control circuit 11. The reproducing signal processing circuit 10 effects the analog signal processing and the digitalization of the pre-amplifier output signal 100 so as to generate the reproducing signal 101. The servo control circuit 11 controls the linear motor 12 so as to carry out the seek operation into the target track and also, performs the focus and tracking control in accordance with the pre-amplifier output signal on the target track. The sector format control circuit 13 separates the address signal recorded in the ID field from the reproducing signal 101 so as to store the coincidence with to the target sector address. The sector format control circuit 13 demodulates the data recorded on the data field of the target sector in the data reproducing operation so as to store it in the memory circuit 6 and also, modulates the data read from the memory circuit 6 in the data recording operation so as to generate the recording signal 102. The laser driving circuit 14 drives the laser within the optical head 9 in accordance with the recording signal 102.

Figure 5:
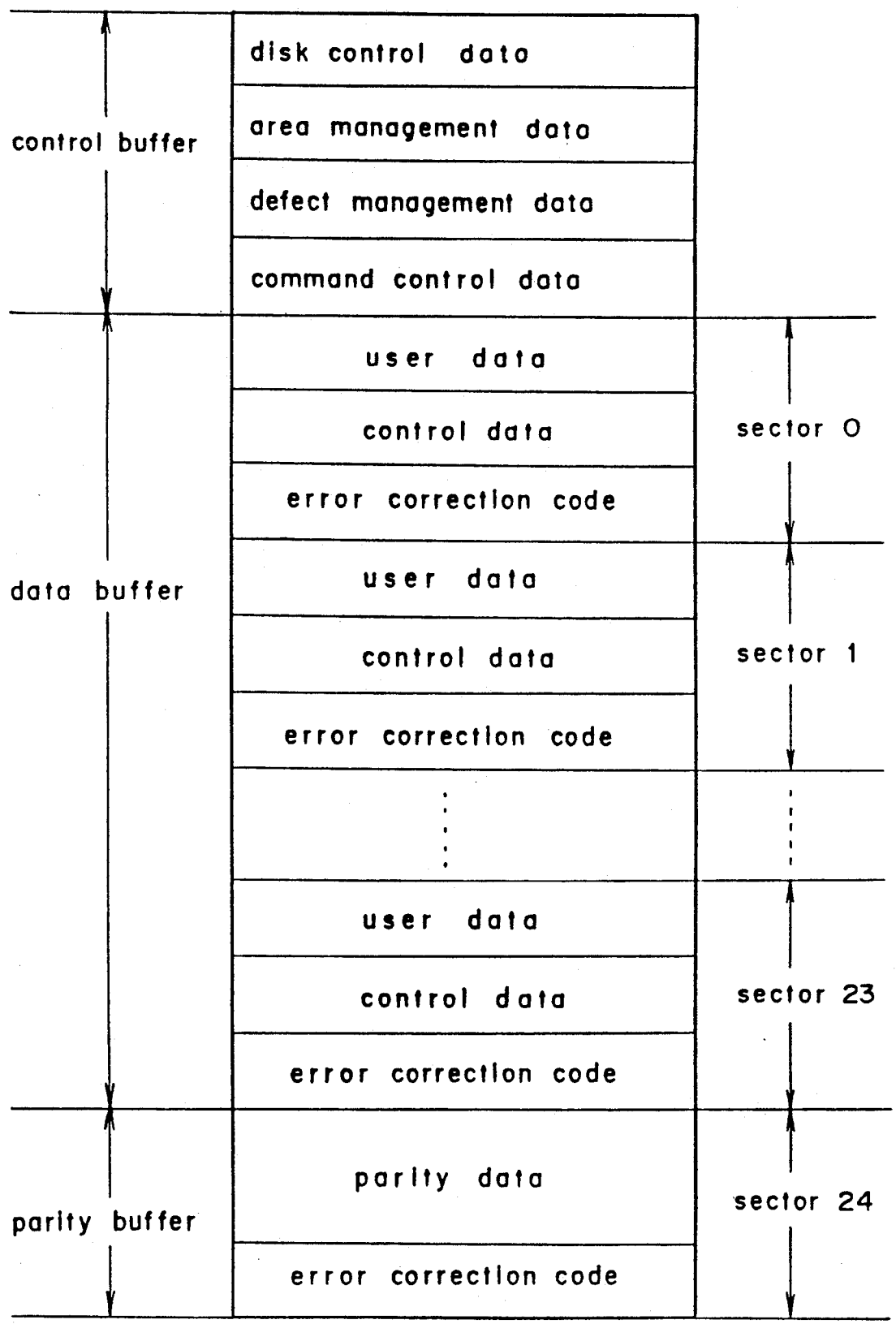
FIG. 5 is a data block structure of a memory used for data processing.

FIG. 5 is a data structure of the memory circuit 6. The interior of the memory circuit 6 is divided into a control buffer, a data buffer and a parity buffer. The disk control data read from the control track area, area management data from the disk definition area, defect management data from the disk definition area and command control data which the microprocessor 1 uses in the command execution are preserved in the control buffer.

The data block to be recorded in or read from the data sector is preserved in the data buffer. The parity block to be read from the parity sector of the virtual ROM area and the ROM area are preserved in the parity block. In FIG. 5, the ROM group is composed of one track having 25 sectors, is to be assigned respectively with the sectors from 0 to 23 being provided as the data sector, and the sector 24 as the parity sector. Therefore, the data buffer is divided into 24 subareas, which includes the user data of 512 byte length to be transferred from the host computer 5, the control data of 4 byte length using the microprocessor 1, and the error correction code. The parity buffer preserved the parity data of 516 byte length to be calculated from the user data and the control data, and the error correction code.

Figure 6:
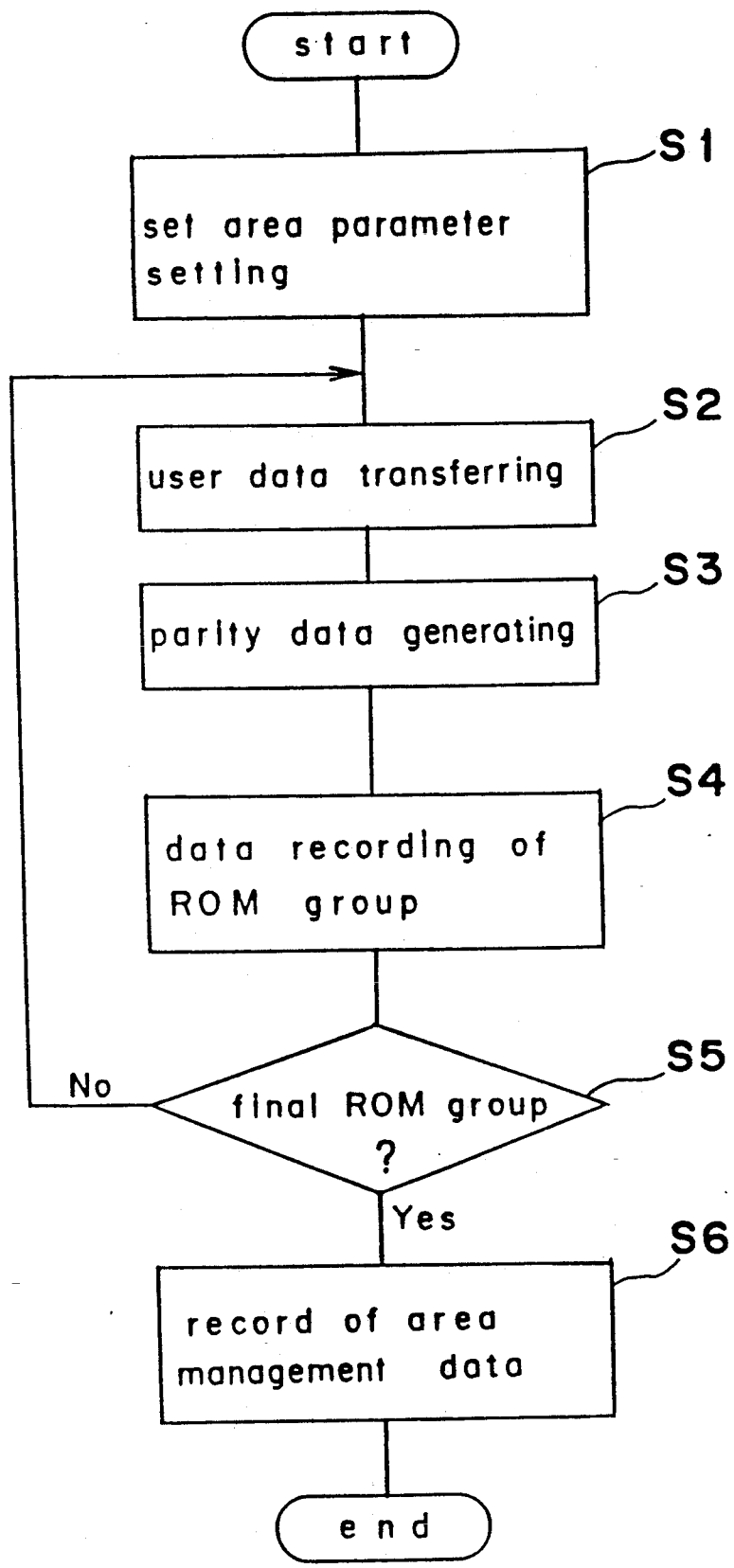
FIG. 6 is a flowchart for explaining the making of an information recording medium having a virtual ROM area.

The procedure for making the virtual ROM area within the user area by the above described information recording and reproducing apparatus 2 described will be described hereinafter in accordance with the flow-chart of FIG. 6. The disk definition area is assumed to be one sector equivalent, and the area management data is assumed to be unrecorded for the simplification of the description.

(S1) The host computer 5 transfers through the host interface 4 the device command having control parameter including the start address and the capacity of the virtual ROM area. The interface control circuit 3 transfers the interface status 103 for informing the microprocessor 1 of the device command reception, and preserves the device command through the internal data bus 7 in the memory circuit 6. The microprocessor 1 reads the device command from the memory circuit 6 so as to preserve in the inner register the control parameter of the virtual ROM area such as the number of ROM groups, the number of data sectors per group and the number of parity sectors per group.

(S2) The microprocessor 1 prerecords in the given area of the memory circuit 6 the control data like the address to be added on the user data. Then, the microprocessor 1 transfers to the interface control circuit 3 the interface control data 104 including the data transfer mode and the data transfer length so as to start the data transfer operation. The interface control circuit 3 transfers the user data from the host computer 5 to the memory circuit 6 in accordance with the interface control data 104. Such data transferring operation is repeatedly carried out for the user data of the 24 sectors.

(S3) The microprocessor 1 calculates the parity data from the user data and the control data in accordance with the following computing formula so as to preserve it in the parity buffer. In the computing formula, the data of the byte k of the sector n is defined as the D(n,k).

$$D(24,k) \; D(0,k) * D(1,k) * \ldots * D(23,k)$$

Here the operator * shows the exclusive OR operation.

(S4) The microprocessor 1 transmits the ECC control data 105 with respect to the error correction circuit 8 so as to start the generating operation of the error correction code. As the error correcting circuit 8 reads the user data and the parity data from the memory circuit 6, and computes the error correcting code corresponding to it so as to store it in the given position of the memory circuit 6. When the generating operation of such error correcting code is carried out in the sector unit with respect to 25 sectors, the error correcting circuit 8 transmits the to the microprocessor 1 the ECC status 106 signalling the completion of the operation. Then, the microprocessor 1 transfers to the servo control circuit 11 the servo control data including the target track address, and commands the seek operation to the track into which the ROM group data of the virtual ROM area are recorded. The servo control circuit 11 transmits the linear motor driving signal 108 to the linear motor 12 and carries out the seek operation to the target track so as to transmit the servo status 109 which signals the completion of the seek operation to the microprocessor 1. When the seek operation is completed, the microprocessor 1 sets in the sector format control circuit 13 the read/write control data 110 such as the operation mode of the data recording, the address of the recording data in the memory circuit 6, the target sector address and so on so as to start the data recording operation. The sector format control circuit 13 demodulates the reproducing signal 101 to separate the address signal and detects the coincidence with the target sector address. When the target sector address is detected, the sector format control circuit 13 sets the write gate signal 111 and also modulates the recording data read from the memory circuit 6 and transmits the recording signal 102 to the laser driving circuit 14. At this time, the laser driving circuit 14 transmits the laser driving signal 112 modulated by the recording signal 102 so as to record the data on the data field of the target sector. Such a data recording operation is carried out with respect to the twenty five sectors. Finally, the sector format control circuit 13 transmits to the microprocessor 1 the read/write status 113 for signalling the completion of the data recording operation.

(S5) When the data recording of the ROM group has been completed, the microprocessor 1 compares the number of ROM groups assigned to the virtual ROM area with the number of ROM groups completed in the data recording operation so as to judge whether or not the entire data recording operation has been completed. If an unrecorded ROM group exists, the microprocessor 1 returns to the procedure (S2) again so as to execute the data recording operation with respect to the next ROM group.

(S6) When the data recording operation with respect to the entire virtual ROM area has been completed, the microprocessor 1 generates the area management data having the area descriptor of the virtual ROM area as shown in FIG. 2 from the control parameter preserved in the inner register so as to record it within the memory circuit 6. Then, the microprocessor 1 records the area management data in the disk definition area as in the data recording operation described at the procedure (S4). When the recording operation of the area management data is completed, the microprocessor 1 transfers the interface control data 104 which signals the command completion into the host computer 5.

By the above described processing procedure, one virtual ROM area is formed within the user area, and the area management data with the management data of the virtual ROM area being retined is recorded in the disk definition area. When the second and its subsequent virtual ROM areas are formed, the area management data is already recorded in the disk definition area. Accordingly, the microprocessor 1 at this time reads from the memory circuit 6 the area management data recorded in the disk definition area so as to add the management data of the new virtual ROM area so as to record the renewed area management data in the disk definition area.

Figure 7:
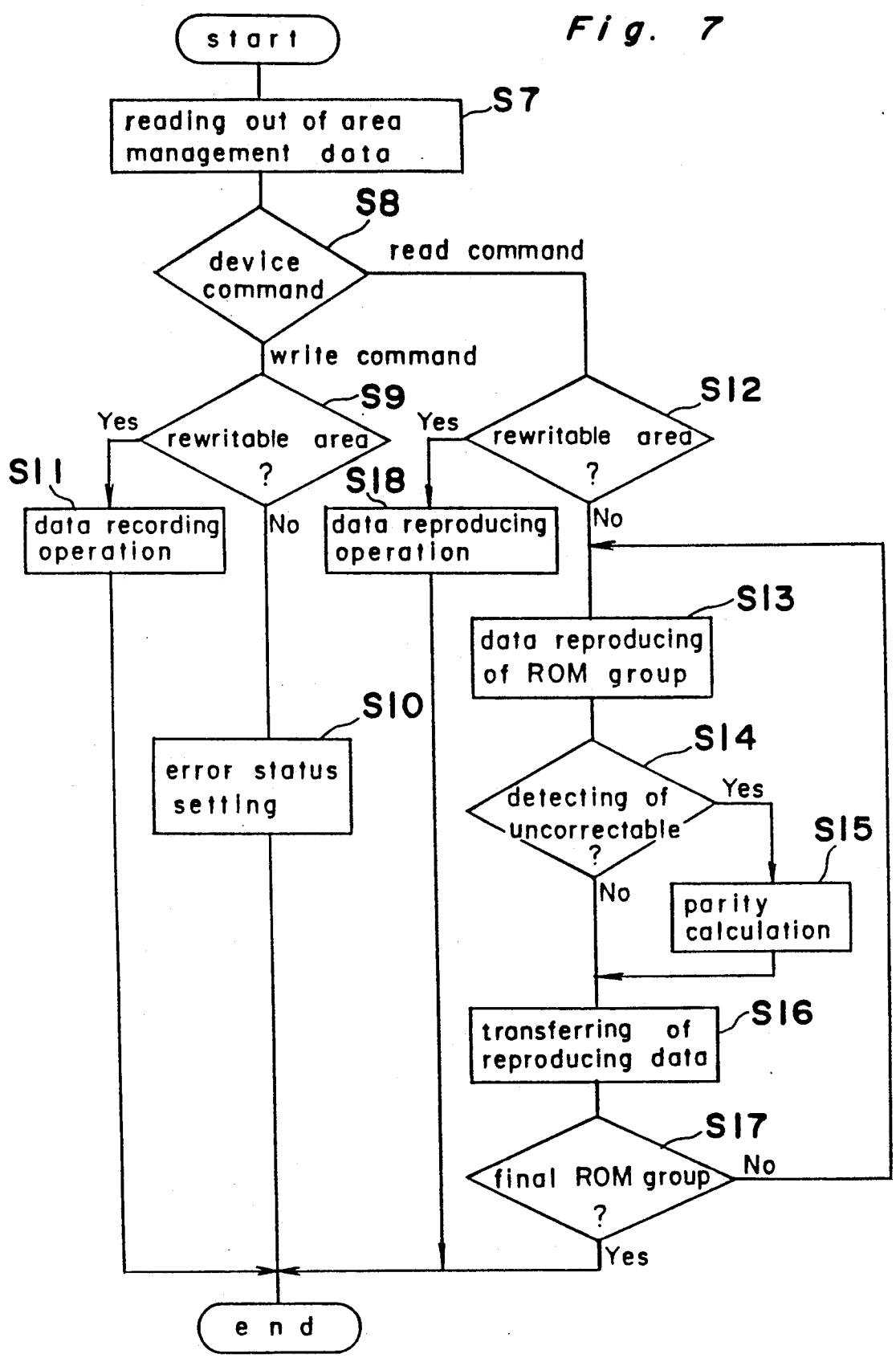
FIG. 7 is a flowchart for explaining the data recording and reproducing operation from the information recording medium having the virtual ROM area.
Figure 8:
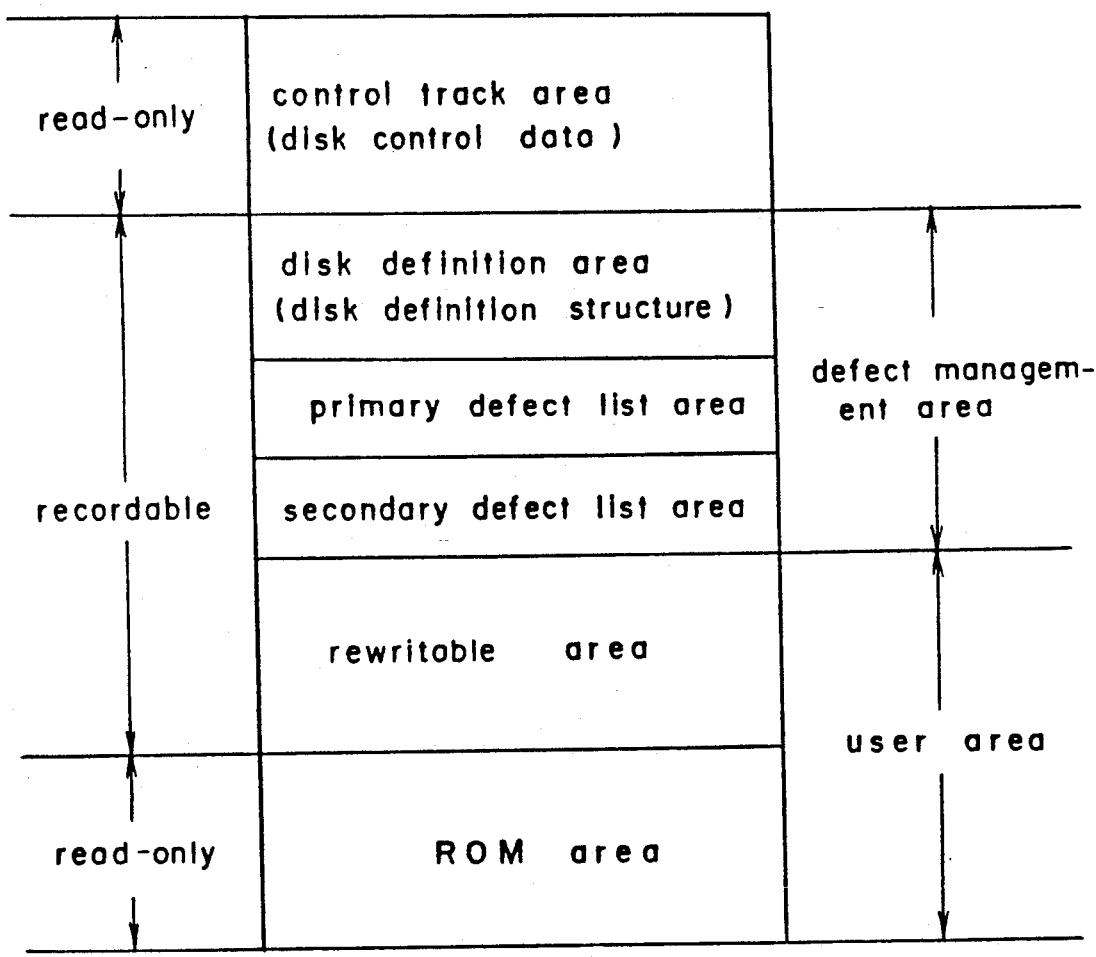
FIG. 8 is an area layout of an information record medium in a conventional embodiment.
Figure 9:
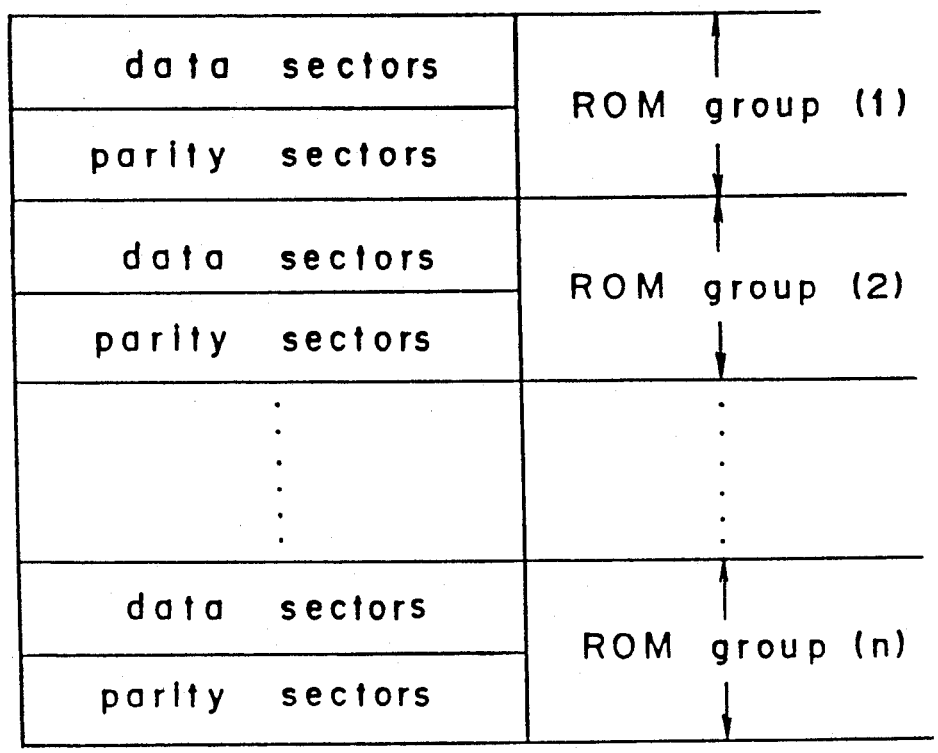
FIG. 9 is an area layout of the ROM area in the conventional embodiment.
Figure 10:
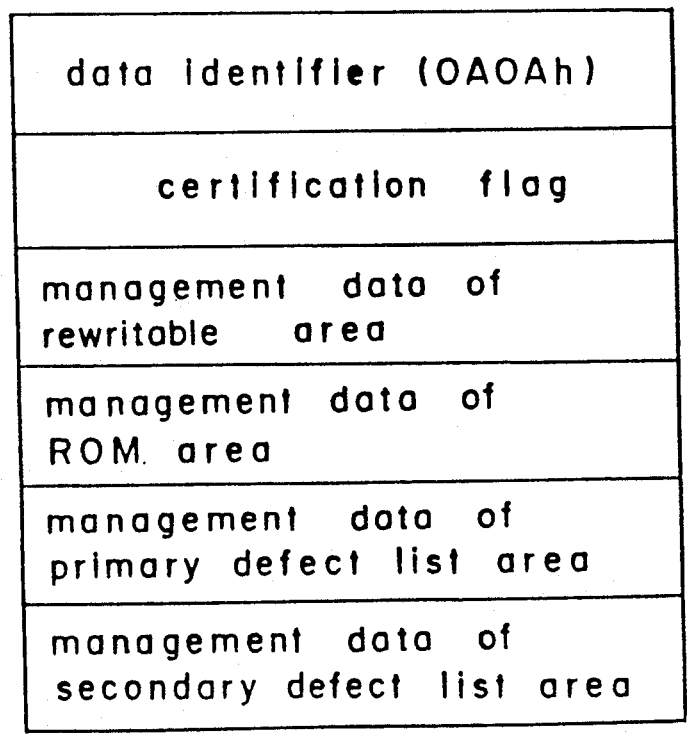
FIG. 10 is a data structure of the disk definition structure.

The procedure of the data read and write operation which is performed by the information recording and reproducing apparatus using the information recording medium with the virtual ROM area, will be described hereinafter in accordance with the flowchart of FIG. 7.

(S7) When the host computer 5 transfers the device command, the microprocessor 1 reads the device command from the memory circuit 6 as in the procedure (S1), stores in the operation code, the address for executing the data recording or reproducing operation and a control parameter such as the number of sectors, in the inner register. The microprocessor 1 causes the servo control circuit 11 as described in the procedure (S4), to execute seek operation in the disk definition area. The microprocessor 1 sets the operation mode for the data reproduction, the target sector address and so on in the sector format control circuit 13 so as to start the data reproducing operation. The sector format control circuit 13 demodulates the reproducing signal from the data field of the target area, storing the read data in the memory circuit 6. Further, the microprocessor 1 instructs the error correcting circuit 8 so as to correct the data errors included in the read data. When the error correction processing is completed, the microprocessor 1 reads the area management data from the memory circuit 6 so as to store it therein.

(S8) The microprocessor 1 judges whether the device command is a write command or a read command from the operation code stored in the inner register in the procedure (S7).

(S9) When the device command is a write command, the microprocessor 1 determines from the contents of the area management data whether or not the data recording area is included in the ROM area or the virtual ROM area where the data recording operation is prohibited.

(S10) When the data recording area is in the ROM area or the virtual ROM area, the microprocessor 1 sets in the interface control circuit 3 the interface control data 104 signaling the write protect error so as to transfer it to the host computer 5 so as to abort the command execution.

(S11) When the data recording area is in the rewritable area, the microprocessor 1 adds the control data to the user data transferred from the host computer 5 as in the procedure (S2). Further, the microprocessor 1 adds the error correcting code to generate the data block as in the procedure (S4), and records it in the data recording area in a sector unit. When the data recording operation with respect to the entire data recording area is completed, the microprocessor 1 transfers to the host computer 5 the interface control data 104 which signals the command completion so as to complete the command execution.

(S12) When the device command is a read command, the microprocessor 1 determines from the contents of the area management data whether or not the data reproducing area is included in the ROM area or in the virtual ROM area.

(S13) When the data reproducing area is included in the ROM area or in the virtual ROM area, the microprocessor 1 executes as follows the data reproducing operation of the ROM group unit. The microprocessor 1 instructs the servo control circuit 11 to execute the seek operation in the target track assigned in the ROM group. Then, the microprocessor 1 instructs the sector format control circuit 13 so as to execute the data reproducing operation of the each sector to be included in the ROM group, and stores the read data in the memory circuit 6.

(S14) The microprocessor 1 transfers the ECC control information 105 with respect to the error correcting circuit 8 so as to start the error correcting processing. The error correcting circuit 8 reads the data in a sector unit from the memory circuit 6, and performs the error correcting process using the error correcting code. When an uncorrectable error has been detected in the error correction processing, the error correcting circuit 8 transfers to the microprocessor 1 the ECC status 106 including the address of the defective sector detected as having the uncorrectable error. Such error correcting processing is carried out over the whole sector to be included in the ROM group.

(S15) The microprocessor 1 judges from the contents of the ECC status 106 whether or not the defective sector is a data sector or a parity sector. When, for example, the sector 0 which is a data sector is a defective sector, the microprocessor 1 computes the user data of the defective sector in accordance with the next computing formula using the data read from the other 24 sectors to be included in the ROM group so as to store it in the memory circuit 6.

$$D(0,k) = D(1,k) * D(2,k) * \ldots * D(24;k)$$

When the parity sector only is a defective sector, the microprocessor 1 does not perform such a parity operation as described hereinabove.

(S16) The microprocessor 1 sets in the interface control circuit 3 the interface control information 104 including the data transfer mode and the data transfer length so as to start the data transfer operation. The interface control circuit 3 transfers to the host computer 5 in the sector unit the user data stored in the memory circuit 6.

(S17) When the data reproducing operation of the data sector within the ROM group has been completed, the microprocessor 1 compares the number of ROM groups to be included in the data reproducing area with the number of ROM groups completed in the data reproducing operation so as to judge whether or not the reproducing operation of the entire data reproducing area has been completed. If an unprocessed ROM group exists, the microprocessor 1 returns to the procedure (S13) so as to execute the data reproducing operation with respect to the next ROM group.

When the data reproducing operation of the entire data reproducing area is completed, the microprocessor 1 transfers the interface control data 104 which signals the command completion to the host computer 5 so as to complete the command execution.

(S18) When the data reproducing area is included in the rewritable area, the microprocessor 1 instructs the servo control circuit 11 to carry out the seek operation to the target track where the start sector of the data reproducing area is located. The microprocessor 1 instructs the sector format control circuit 13 to execute the data reproducing operation of each data sector specified in the data reproducing area and instructs the error correcting circuit 8 to execute the error correction processing. The microprocessor 1 instructs the interface control circuit 3 to transfer to the host computer 5 from the memory circuit 6 the user data read from the data reproducing area, and further transmits to the host computer 5 the interface control data 104 which signals the command completion so as to complete the command execution.

In accordance with the above described processing procedure, the data read and write operation using the information recording medium with the virtual ROM area is carried out. In the above described procedure (S13), the data reproducing operations of the data sector and the parity sector have been performed at the same time in the ROM group unit. There is such a processing procedure as to carry out the data reproducing operation of the parity sector, only when the defective sector has been detected with the data reproducing operation of the data sector. In the processing procedure (S15), one defective sector is assumed to be detected from the ROM group. If two or more defective sectors have been detected from the same ROM group, the microprocessor 1 judges that error recovery cannot be performed. The interface control data 104 which signals the detection of the unrecovered error is transferred to the host computer 5 to abort the command execution.

In the processing procedures (S3) and (S15) described so far, the microprocessor 1 has executed the computing processing of the parity data and the recovering processing of the data error using the parity data by the firmware stored therein, but it is also possible to execute the computation using hardware as in the error correcting code. In the above described processing procedure, the ROM group is composed of data blocks of the 24 sectors and the party sector. It is possible to cope with a larger capacity ROM group and to process a plurality of ROM group data at one time by the use of a memory circuit 6 having a larger capacity.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A disk shaped information recording medium in which information is recorded or reproduced in sectors, comprising:
   a user area for recording user data;
   a disk definition area for recording management data to be assigned within said user area;
   a virtual ROM area in which data recording within sat least one portion of lane area within the user area is prevented from being used for data recording by a user, said virtual ROM area being physically of the same construction as that of the recordable user area;
   wherein area management information containing the management information of said virtual ROM area is recorded in the disk definition area.

2. An information recording medium in accordance with claim 1, further comprising an actual ROM area formed within said user area.

3. An information recording medium in accordance with claim 1 wherein said virtual ROM area is divided into ROM groups including a plurality of data sectors where user data is recorded, and a parity block where parity data computed from said user data is recorded.

4. An information recording medium in accordance with claim 2, wherein said management data is composed of a header including management data of the entire information recording medium, and area descriptors of rewritable areas, said virtual ROM area and said actual ROM area.

5. An information recording and reproducing apparatus which is connected to a host computer, and performs read write operations in a sector unit with respect to a disk shaped information recording medium having a user area where user data is recorded and a disk definition area where area management data is recorded, comprising: a data transferring means for transferring a device command and the user data; an area assigning means for assigning a virtual ROM area into a rewritable user area and for producing the area management data including management data of the virtual ROM area; a parity computing means for computing parity data; an error correction code producing means for producing a data block and a parity block with the addition of error correction codes; a data preserving means for temporarily preserving the data block, the parity block and drive control data including the area management data; a data recording means for respectively recording the data block and the parity block on the virtual ROM area and for also recording the area management data on a disk definition area.

6. An information recording and reproducing apparatus in accordance with claim 5, wherein said parity operating means generates the the parity data using a microprocessor.

7. An information recording and reproducing apparatus which is connected to a host computer, and performs read/write operations in a sector unit with respect to a disk-shaped information recording medium having a virtual ROM area recorded in one portion of a suer area, and also having area management data including management data of the virtual ROM area recorded on a disk definition area, comprising: a data transfer means for transferring a device command and user data; a data reproducing means for reading the area management data from the disk definition area, and for also respectively reading a data block and a parity block and drive control data including the area management data; a write prohibiting means for prohibiting a data recording operation into the virtual ROM area; an error detecting and correcting means for performing error correction with respect to the data block and the parity block and also, and for detecting a defective sector having an uncorrectable error; and a data recovering means for operating upon user data form the defective sector.

8. An information recording and reproducing apparatus in accordance with claim 7, wherein said data recovering means generates the user data of the defective sector using a microprocessor.

* * * * *